United States Patent
Farah et al.

(10) Patent No.: US 11,787,088 B2
(45) Date of Patent: Oct. 17, 2023

(54) RECYCLING PROCESSES FOR LAMINATES AND MULTI-LAYERS

(71) Applicant: Braskem S.A., Camaçari (BR)

(72) Inventors: Marcelo Farah, São Paulo (BR);
Bárbara Iria Silva Mano, São Paulo (BR); Ana Paula Rodrigues Camilo, São Paulo (BR)

(73) Assignee: Braskem S.A., Camaçari (BR)

( * ) Notice: Subject to any disclaimer, the term of this patent is extended or adjusted under 35 U.S.C. 154(b) by 426 days.

(21) Appl. No.: 16/432,676

(22) Filed: Jun. 5, 2019

(65) Prior Publication Data

US 2019/0366591 A1 Dec. 5, 2019

Related U.S. Application Data (60) Provisional application No. 62/680,942, filed on Jun. 5, 2018.

(51) Int. Cl.
| | |
|---|---|
| B29B 17/02 | (2006.01) |
| B29B 17/04 | (2006.01) |
| B29C 48/69 | (2019.01) |
| B29C 44/20 | (2006.01) |
| B29K 23/00 | (2006.01) |

(Continued)

(52) U.S. Cl.
CPC .......... B29B 17/02 (2013.01); B29B 17/0412 (2013.01); *B29B 2017/0203* (2013.01); *B29B 2017/0224* (2013.01); *B29B 2017/0255* (2013.01); *B29C 44/20* (2013.01); *B29C 48/69* (2019.02); *B29K 2023/00* (2013.01); *B29K 2023/0625* (2013.01); *B29K 2023/0633* (2013.01); *B29K 2023/12* (2013.01); *B29K 2067/003* (2013.01); *B29K 2077/00* (2013.01); *B29K 2105/04* (2013.01);

(Continued)

(58) Field of Classification Search
CPC ............ B29B 17/02; B29B 2017/0203; B29B 2017/0224
See application file for complete search history.

(56) References Cited

U.S. PATENT DOCUMENTS

| | | | |
|---|---|---|---|
| 5,233,021 A | 8/1993 | Sikorski | |
| 5,320,798 A * | 6/1994 | Chambon | B29C 48/92 264/564 |

(Continued)

FOREIGN PATENT DOCUMENTS

| | | |
|---|---|---|
| AR | 009850 A1 | 5/2000 |
| AR | 100196 A1 | 9/2016 |

(Continued)

OTHER PUBLICATIONS

Translation of Maeurer Andreas et al. (WO 2011082802 A1), Jul. 14, 2011 (Year: 2011).*

(Continued)

*Primary Examiner* — Benjamin A Schiffman
(74) *Attorney, Agent, or Firm* — Osha Bergman Watanabe & Burton LLP (57) ABSTRACT

A method of recycling a first polymer from a multi-component polymer product may include subjecting the multi-component polymer product that includes a first polymer and at least one additional component to conditions to melt the first polymer; and filtering the at least one additional component from the molten first polymer.

32 Claims, 6 Drawing Sheets

(51) Int. Cl.
*B29K 67/00* (2006.01)
*B29K 77/00* (2006.01)
*B29K 105/04* (2006.01)
*B29K 105/26* (2006.01)

(52) U.S. Cl.
CPC .... *B29K 2105/26* (2013.01); *B29K 2995/004* (2013.01); *B29K 2995/0039* (2013.01)

(56) References Cited

U.S. PATENT DOCUMENTS

| | | | | |
|---|---|---|---|---|
| 7,087,655 | B2* | 8/2006 | Tucker | B29B 17/0408 521/45.5 |
| 7,884,140 | B2* | 2/2011 | Riise | B29B 17/02 521/40 |
| 8,314,207 | B2* | 11/2012 | Friedlaender | B29C 48/69 528/502 A |
| 2017/0096552 | A1 | 4/2017 | Habert et al. | |

FOREIGN PATENT DOCUMENTS

| | | | | |
|---|---|---|---|---|
| EP | 0850982 | A2 | 7/1998 | |
| EP | 2 371 508 | A1 | 10/2011 | |
| EP | 3012078 | A1 | 4/2016 | |
| EP | 3305839 | A1 * | 4/2018 | C08J 11/08 |
| WO | 02/38276 | A1 | 5/2002 | |
| WO | 2011/082802 | A1 | 7/2011 | |
| WO | 2017/054066 | A2 | 4/2017 | |

OTHER PUBLICATIONS

Partial International Search Report included in a PCT Invitation to Pay Additional Fees and, Where Applicable, Protest Fee, dated Oct. 1, 2019, issued in corresponding International Application No. PCT/IB2019/020019 (16 pages).

Bledzki, A. K., et al., "Devices for filtration of molten plastics;", International Polymer Science and Technology, vol. 23, No. 10, Jan. 1, 1996 (Jan. 1, 1996); XP000689656, ISSN: 0307-174X; pp. T/103-T/108 (6 pages).

Chen, Xiaopeng, et al., "Plasticization Effects on Bubble Growth During Polymer Foaming;" Polymer Engineering and Science, vol. 46, No. 1, Jan. 1, 2005 (Jan. 1, 2005); XP055624093, US, ISSN: 0032-3888, DOI: 10.1002/pen.20434; pp. 97-107 (11 pages).

International Search Report issued in corresponding International Application No. PCT/IB2019/020019; dated Nov. 25, 2019 (6 pages).

Written Opinion of the International Searching Authority issued in corresponding International Application No. PCT/IB2019/020019; dated Nov. 25, 2019 (10 pages).

* cited by examiner

RECYCLING PROCESSES FOR LAMINATES AND MULTI-LAYERS

BACKGROUND

A large variety of products are fabricated from thermoplastic composites or multi-component materials. These products are often comprised of multiple polymers or polymers and inorganic material, which may be present in distinct phases and that may be referred to as multi-layer or blended systems or products. The tailorable polymer/polymer or polymer/inorganic material combination is directly dependent upon the desired function of the ultimate product. Laminate materials, produced from a lamination process, are often engineered to possess particular barrier properties that may be provided by the combination of layers of dissimilar polymers. Commonly, polyolefin polymers, such as polyethylene (PE) and polypropylene (PP), may be used to manufacture a varied range of articles, including films, molded products, foams, and the like. In multi-component systems, particularly laminated systems, polymers may often be combined with or manufactured to comprise aluminum or other inorganic materials as well to achieve the specific barrier characteristics desired.

Polyolefins may have characteristics such as high processability, low production cost, flexibility, low density and recycling possibility. However, physical and chemical properties of polyolefin compositions may exhibit varied responses depending on a number of factors such as molecular weight, distribution of molecular weights, content and distribution of comonomer (or comonomers), method of processing, and the like.

Common methods for manufacturing multi-component polymer systems include, but are not limited to, extrusion, co-extrusion, and lamination processes. Extrusion or coextrusion is a process where one or more polymers are fed through a special die and the molten polymer fluids are contacted in a melt state. The resulting multi-component compositional characteristics are dependent upon parameters of the extrusion process. Notable parameters include, but are not limited to, the melt temperature and liquid polymer viscosity. Adhesive lamination is another common production process that differs from extrusion in that it is used to fabricate compositions of distinct layers through the physical adhesion of one or more polymer films wherein the adhesion process is facilitated under specific chemical, temperature and pressure parameters.

These methods of multi-component polymer production may utilize polyolefin's limited inter- and intra-molecular interactions, capitalizing on the high degree of freedom in the polymer to form different microstructures, and to modify the multi-polymer composite to achieve the product. Consequently, where recycling processes have the potential to convert laminated or composite materials into useful raw materials, there may be instances where the basic incompatibility of the polymers in the recyclable product leads to production of non-homogeneous blends that have unacceptable physical properties. This incompatibility often arises as a result of poor layer-layer interaction between polar and nonpolar polymer phases. This can result in a recycled product that may exhibit low mechanical resistance and low optical transparence. Multi-component products are often difficult to recycle in that the ultimate post-consumer product mixtures generally require a separation of the polymer components. These separation processes typically include mechanical separation or chemical separation or a mixture of the two.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein are directed to a method for recycling a first polymer from a multi-component polymer product comprising: subjecting the multi-component polymer product comprising a first polymer and at least one additional component to conditions to melt the first polymer; and filtering the at least one additional component from the molten first polymer.

In another aspect, embodiments of the present disclosure are directed towards a method of recycling a first polymer from a multi-layer polymer product, comprising: subjecting the multi-layer polymer product comprising the first polymer and at least one inorganic material layer to conditions to melt the first polymer; and filtering the at least one inorganic material from the molten first polymer.

In another aspect, embodiments of the present disclosure are directed towards method of recycling a non-polar polymer from a multi-layer polymer product that includes subjecting the multi-layer polymer product, the multi-layer polymer product comprising a plurality of polymer layers, the plurality of polymer layers including layers of polar polymer and layers of non-polar polymer, to conditions to melt the multi-layer polymer product and form polar polymer particles dispersed in a continuous phase comprising the non-polar polymer; and at least partially filtering the dispersed polar polymer from the continuous phase.

In another aspect, embodiments of the present disclosure are directed towards a method of recycling a non-polar polymer from a multi-layer polymer product, comprising: subjecting the multi-layer polymer product, the multi-layer polymer product comprising a plurality of polymer layers where the plurality of polymer layers including at least one layer of the non-polar polymer, and at least one layer of polar polymer, to conditions to melt the non-polar polymer and the polar polymer; selectively crosslinking the polar polymer; and filtering the selectively crosslinked polar polymer from the molten non-polar polymer.

In yet another aspect, embodiments of the present disclosure are directed towards a recycled polymer composition comprising the filtered first polymer or the filtered continuous phase produced by the method described in the above embodiments.

Other aspects and advantages of the claimed subject matter will be apparent from the following description and the appended claims.

DETAILED DESCRIPTION

Embodiments of the present disclosure are directed to a method of recycling multi-component polymer products containing a mixture of polymer and inorganic material or multiple polymers. In particular, embodiments of the present disclosure are directed to the selective filtering of a polymer component from the multi-component polymer product, thereby allowing for physical separation of at least one other component therefrom.

In the present disclosure, the terms "multi-component polymer product", "multi-layer" polymer product, "laminate" and "co-extruded multi-layer product" are used. As used herein a multi-component polymer product refers to a polymer product containing multiple components (at least one of which is a polymer component), which may include a blended product or a multi-layer product. A multi-layer polymer product may be in the form of a layered structure (as compared to a blended product, which may include multiple components, i.e., polymers, within a single layer or structure), in which each layer may have a distinct composition. Such layered structure may include laminates or co-extruded multi-layer products. Laminates refer to a multi-layer product that is formed from two films which are separately formed and then joined together by pressing, heating, and/or adhesion. Laminates may include multiple polymeric layers or a combination of polymeric and inorganic layers. In contrast, a co-extruded multi-layer product (such as a multi-layer film) refers to a product that has multiple distinct compositional layers, but which are formed in an extrusion or co-extrusion process. Specifically, for example, multiple polymers may, in a molten state, be fed to a dye that extrudes multiple polymeric layers within a single film, such that delamination (even at the edges) is not observed. Further, it is also envisioned that a multi-layer polymer product may include a laminate with a multi-layer coextruded film.

In each of such products, there are multiple components present, making recycling of the product difficult. However, embodiments of the present disclosure utilize recycling processes that selectively address the different components such as by selective melting, selective crosslinking, etc. so that one or more of the components may be separated therefrom. In one or more embodiments, the additional component may be removed from the first polymer such that the recycled polymer composition has at least a 50% reduction in the amount of the additional component contained therein, or in at least a 60%, 70%, 80,%, 90%, 95%, 99% or 100% reduction in the amount of additional component contained therein.

One or more embodiments are directed to recycling of a laminate of at least one polymeric layer (being a polar or non-polar) and an inorganic material layer. Thus, one or more embodiments may include subjecting the multi-layer polymer product (laminate) comprising a polymeric layer of a first polymer and at least one inorganic material layer to conditions that may selectively melt (in an extruder, for example) the first polymer and subsequently filtering the at least one inorganic material from the molten first polymer. It is understood that depending on the feed source, such multi-layer polymer product may be subjected to a size reduction step (discussed in greater detail below) prior to the addition of the multi-layer polymer product to the extruder. Further, as discussed below, one or more inert components may be added to the extruder to assist in the separation of the first polymer and inorganic material/filtering of the inorganic material therefrom.

One or more other embodiments are directed to recycling of a multi-component polymer product that contains at least two polymeric components: one being non-polar and the other being polar. In some embodiments, the multi-polymer product that contains at least two polymeric components may be a multi-layer product (including a laminate or a multi-layer co-extruded product) or a blend of multiple polymeric components. In accordance with embodiments of the present disclosure, the multi-component polymer product containing at least two polymeric components (in particular, one or more layers of non-polar polymer and one or more layers of polar polymer) may be subjected to conditions that melt the polymeric components, allowing the coalescence of the polar polymers to form polar polymer particles dispersed in a continuous phase of the non-polar polymer. The dispersed polar polymer may be at least partially filtered from the continuous phase (non-polar polymer). Such filtering may occur by using selection of process temperatures used in the filtering so that the polymer may coalesce into particles dispersed in a continuous phase and then have the temperature reduced to a temperature that is between the melting temperature of the non-polar polymers (highest Tm) and the melting temperature of the polar polymers (lowest Tm) so that the two can be separated from each other. Cros slinking may be optional in such embodiments, but it is specifically envisioned that the filtering may occur without crosslinking where the "solid" polar polymer particles are separated from a molten continuous phase based on the reduced temperature during the filtering step.

In accordance with embodiments of the present disclosure, the multi-component polymer product containing at least two polymeric components may be subjected to conditions that melt the polymeric components, allowing the coalescence of the polar polymer into particles with a desirable particle size within the non-polar polymer matrix (or continuous phase) and subsequently selectively crosslink the polar polymer particles within the matrix of the non-polar polymer (including but not limited to a polyolefin). The polar polymer may be crosslinked by a crosslinking agent to generate particulates containing intraparticle covalent linkages between the constituent polar polymer chains. Depending on the relative proximity of adjacent polar polymer particles (and concentration), it is also recognized that there may also be inter-particle covalent linkages that are formed. The crosslinking of the polar polymer particles allows a morphology "freezing" of the particles, therefore decreasing the possibility of deformation and permitting their retention by the mesh screen, otherwise unlikely to happen, as the polar polymer particles would deform and pass through the mesh. It is envisioned that even a partial crosslinking of the polar polymer particles (as a core-shell structure, for example, wherein the shell is crosslinked and the core isn't) may be sufficient to achieve this effect. The conditions of the extrusion may be tuned to provide for formation of larger particles in the molten non-polar polymer, with a low degree of dispersion and low interaction between the polar and non-polar polymers.

As mentioned above, and as discussed in further detail below, in some embodiments, an inert component may be injected into the extruder. The inert component may be one that is capable of swelling one or more of the polymers within the multi-component system, for example. The addition of the inert component may aid the filtration process by increasing the hydrodynamic volume of the molten polymer phase and effectively decreasing interactions between the molten phase and crosslinked polar polymer particles and between polymers and inorganic materials.

The components present in the multi-component polymer product, as well as components or materials used in the present recycling methods are discussed in turn.

Non-Polar Polymers

One or more embodiments of the present disclose may include non-polar polymers such as polyolefins may be desirably recycled from a multi-component polymer product. Depending on the form of the multi-component polymer product, it is understood that the non-polar polymer may form a polymer layer, a matrix phase, or even a dispersed phase in the multi-component polymer product. Non-polar polymers are polymers that are incompatible or poorly compatible with polar polymers. In one or more embodiments the non-polar polymers may include polyolefins, polystyrene, rubbers or combinations thereof.

In one or more embodiments, polyolefins include polymers produced from unsaturated monomers (olefins or "alkenes") with the general chemical formula of $C_nH_{2n}$. In some embodiments, polyolefins may include ethylene homopolymers, copolymers of ethylene and one or more C3-C20 alpha-olefins, propylene homopolymers, heterophasic propylene polymers, copolymers of propylene and one or more comonomers selected from ethylene and C4-C20 alpha-olefins, olefin terpolymers and higher order polymers, and blends obtained from the mixture of one or more of these polymers and/or copolymers. In one or more embodiments, polyolefins may include polyolefins generated from petroleum based monomers and/or biobased monomers, such as ethylene obtained by the dehydration of biobased alcohols derived from sugarcane. Commercial examples of biobased polyolefins are the polyethylenes of the "I'm Green"™ line from Braskem S.A.

Rubbers in accordance with the present disclosure may include one or more of natural rubber, poly-isoprene (IR), styrene and butadiene rubber (SBR), polybutadiene, nitrile rubber (NBR); polyolefin rubbers such as ethylene-propylene rubbers (EPDM, EPM), and the like, chlorinated butyl rubber, brominated isotubylene, polychloroprene, and the like; sulfur-containing rubbers such as polysulfidic rubber; fluorinated rubbers; thermoplastic rubbers such as elastomers based on styrene, butadiene, isoprene, ethylene and propylene, styrene-isoprene-styrene (SIS), styrene-ethylene-butylene-styrene (SEBS), styrene-butylene-styrene (SBS), and the like.

In one or more embodiments, multi-component polymer products may contain a percent by weight of the total composition (wt %) of non-polar polymer ranging from a lower limit selected from one of 30 wt %, 40 wt %, 50 wt %, 60 wt %, 75 wt %, and 85 wt %, to an upper limit selected from one of 60 wt %, 75 wt %, 80 wt %, 90 wt %, 95 wt %, 99.5 wt % and 99.9 wt %, where any lower limit can be used with any upper limit. Further, in a recycled polymer composition, it is envisioned that the recycled polymer composition may contain a percent by weight of the total composition (wt %) that ranges from a lower limit to 30 wt %, 40 wt %, 50 wt %, 60 wt %, 75 wt %, and 85 wt %, to an upper limit selected from one of 60 wt %, 75 wt %, 80 wt %, 90 wt %, 95 wt %, 99.5 wt % and 99.9 wt %, where any lower limit can be used with any upper limit. Where the additional component is filtered from the non-polar polymer, it is envisioned that the recycled polymer composition may contain a percent by weight of the total composition (wt %) that ranges from a lower limit to 60 wt %, 75 wt %, 85 wt %, 90 wt %, 95 wt %, 99 wt % to an upper limit selected from one of 60 wt %, 75 wt %, 80 wt %, 90 wt %, 95 wt %, 99.5 wt %, 99.9 wt %, and 100 wt %, where any lower limit can be used with any upper limit.

Polar Polymers

The multi-component polymer products of the present disclosure may include one or more polar polymers that are combined with the non-polar polymer (including but not limited to polyolefins) in the multi-component product, either as a blend or multi-layer structure such that the present methods may be used to separate the materials from each other. In accordance with the present recycling methods, the polar polymer may be crosslinked during such recycling by one or more crosslinking agents. As used herein, a "polar polymer" is understood to mean any polymer containing hydroxyl, carboxylic acid, carboxylate, ester, ether, acetate, amide, amine, epoxy, imide, imine, sulfone, phosphone, and their derivatives, as functional groups, among others. The polar polymer may be selected from the group consisting of polyvinyl alcohol (PVOH), ethylene vinyl alcohol (EVOH) copolymer, ethylene vinyl acetate copolymer polymer (EVA), polyamide, polyvinylidene fluoride, polyethylene terephthalate, and mixtures thereof. The polar polymer may be selectively crosslinked by an appropriate crosslinking agent, where the selective crosslinking may occur between the functional groups by reacting with a suitable crosslinking agent in the presence of polyolefins, additives, and other materials. Thus, the crosslinking agent is selected to react with the polar polymer but without exhibiting reactivity (or having minimal reactivity towards) the non-polar polymer.

In one or more embodiments, the polar polymer to be removed from the recycled polymer composition, the polar polymer may form distinct phases during the extrusion process to form particles having an average particle size of greater than 15 µm, 30 µm, 50 µm, 100 µm, 200 µm, or 300 µm, depending on the size of the mesh screen incorporated in the extruder.

In one or more embodiments, the polar polymer particles are a semi-crystalline polymer. In such embodiments, the conditions to melt the polar polymer (in a multi-layer polymer product) involve subjecting the multi-layer polymer product to a temperature higher than the highest melting temperature (Tm) detectable in a DSC curve of the multi-layer polymer product.

In one or more other embodiments, the polar polymer particles are amorphous. In such embodiments, the conditions to melt the polar polymer (in a multi-layer polymer product) involve subjecting the multi-layer polymer product to a temperature at least 50° C. higher than the highest glass transition temperature (Tg) detectable in a DMA curve of the multi-layer polymer product Crosslinking Agent In one or more embodiments, a crosslinking agent may be used to crosslink a selected polymer phase in recycling stream. As used herein, a "crosslinking agent" is understood to mean any bi- or multi-functional chemical substance capable of reacting selectively with the polar groups of a polymer, forming crosslinks between and within the constituent polymer chains. As used herein, "selective" or "selectively" used alone or in conjunction with "crosslinking" or "crosslinked" is used to specify that the crosslinking agent reacts exclusively with the polar polymer, or that the crosslinking agent reacts with the polar polymer to a substantially greater degree (98% or greater, for example) than with respect to the non-polar polymer. In one or more embodiments, crosslinking agents with three or more functional-groups may be used.

In one or more embodiments, crosslinking agents in accordance with the present disclosure may include linear, branched, saturated, and unsaturated carbon chains containing functional groups that react with counterpart functional groups present on the backbone and termini of a polar polymer incorporated into a polymer composition. In some embodiments, crosslinking agents may be added to a multi-component polymer product containing a non-polar polymer and a polar polymer, prior to melting of the polymer product, in order to crosslink the polar polymer in the presence of the non-polar polymer, within an extruder to which the combination is added. It is also envisioned that the crosslinking agent may be injected into the extruder after the addition of the multi-component polymer product thereto. Following addition thereto, a crosslinking agent may react with the polar polymer within the particles, creating intraparticle crosslinks between the polar polymer chains.

Crosslinking agents in accordance with the present disclosure may include, for example, maleic anhydride, maleic acid, itaconic acid, itaconic anhydride, succinic acid, succinic anhydride, succinic aldehyde, adipic acid, adipic anhydride, phthalic anhydride, pthalic acid, citric acid, glutaconic acid, glutaconic anhydride, glutaraldehyde, sodium tetraborate, organic titanates such as tetrabutyl titanate, organic zirconates such as zirconium(IV) bis(diethyl citrato)dipropoxide, methoxy polyethylene glycol acrylates, ethoxy polyethylene glycol acrylates, ethylene glycol diacrylate, ethylene glycol dimethacrylate, polypropylene glycol diacrylate, polypropylene glycol dimethacrylate, 1,3-butylene glycol diacrylate, 1,3-butylene glycol dimethacrylate, neopentyl glycol diacrylate, neopentyl glycol dimethacrylate, trimethylol ethane triacrylate, trimethylol ethane trimethacrylate, trimethylol propane triacrylate, trimethylol propane trimethacrylate, and tetramethylol methane tetracrylate, their derivatives and mixtures thereof.

In one or more embodiments, crosslinking agents may be added to the multi-component polymer product (or within an extruder containing such multi-component polymer product) at a percent by weight (wt %) of the blend ranging from a lower limit selected from one of 0.001 wt %, 0.01 wt %, 0.05 wt %, 0.5 wt %, 1 wt %, and 2 wt % to an upper limit selected from one of 1.5 wt %, 2 wt %, 5 wt %, and 10 wt %, where any lower limit can be used with any upper limit.

Inorganic Material

As mentioned above, one or more embodiments use an inorganic material in a multi-component polymer product that contains the inorganic material as well as at least one polymer (which may be a non-polar polymer, such as a polyolefin, or a polar polymer, including those described above). In one or more embodiments, the inorganic material may include metals, for example, copper, aluminum, nickel and steel or a mixture thereof. Further, it is also envisioned that the inorganic material may be used with multiple polymers, including, for example, a polyolefin and a polar polymer, multiple non-polar polymers, and multiple polar polymers).

The inorganic material to be removed from the recycled polymer composition, may be present during the extrusion process in the form of particles, flakes, granules or any other form of small size particles. The inorganic particles may be present in the recycled polymer composition having a particle size of greater than 30 μm, 50 μm, 100 μm, 200 μm, or 300 μm, in at least one of the three dimensions, depending on the size of the mesh screen incorporated in the extruder.

Inert Component

In one or more embodiment of the present disclosure an inert component may be injected or applied in the extrusion process. The inert component may be one that is capable of swelling one or more of the polymers (particularly the non-polar polymer or other polymer from which a polar polymer or inorganic material is being separated therefrom) within the multi-component system, thereby aiding separation of the non-swollen crosslinked polar polymer particles or inorganic material. Further, the inert component may also reduce the general viscosity of the molten polymer, allowing the polymer matrix to more easily flow through a filter or screen within the extruder, leaving the additional material (such as inorganic material or selectively crosslinked polymer particles) retained on a screen. The inert component may be in a gaseous, liquefied, or supercritical state, and in one or more embodiments may be selected from a group consisting of $CO_2$, $N_2$, water, organic solvents and combinations thereof, as well as other inert components, which eventually be separated from the molten polymer by a degassing step. It is also envisioned that the inert component may be produced by decomposition of a blowing agent during the extrusion of the recycled polymer composition, which may be added together or separate from the multi-component polymer product in the extrusion.

In one or more embodiments, the inert component may be injected at an amount ranging from 0.5 to 20 wt % (of the multi-component polymer product), including a lower limit of any of 0.5, 1, 1.5, 2, 5 or 10 wt % and an upper limit of 5, 8, 10, 12, 15, 18, or 20 wt %, where any lower limit can be used in combination with any upper limit.

Blowing agents that may be injected or fed to the extruder may selected from organic or chemical blowing agents. Organic solvent blowing agents include aliphatic hydrocarbons having 1-9 carbon atoms, halogenated aliphatic hydrocarbons, having 1-4 carbon atoms, and aliphatic alcohols having 1-3 carbon atoms. Aliphatic hydrocarbons include methane, ethane, propane, n-butane, isobutane, n-pentane, isopentane, neopentane, and the like. Among halogenated hydrocarbons, fluorinated hydrocarbons are preferred. Examples of fluorinated hydrocarbon include methyl fluoride, perfluoromethane, ethyl fluoride, 1,1-difluoroethane (HFC-152a), 1,1,1-trifluoroethane (HFC-143a), 1,1,1,2-tetrafluoro-ethane (HFC-134a), pentafluoroethane, perfluoroethane, 2,2-difluoropropane, 1,1,1-trifluoropropane, perfluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), dichlorotetrafluoroethane (CFC-114), chloroheptafluoropropane, and dichlorohexafluoropropane. Fully halogenated chlorofluorocarbons are not preferred due to their ozone depletion potential. Aliphatic alcohols include methanol, ethanol, n-propanol, and isopropanol.

Chemical blowing agents include azodicarbonamide, azodiisobutyro-nitrile, benzenesulfonhydrazide, 4,4-oxybenzene sulfonylsemicarbazide, p-toluene sulfonyl semi-carbazide, barium azodicarboxylate, N,N'-dimethyl-N,N'-dinitrosoterephthalamide, and trihydrazino triazine.

In one or more embodiments, blowing agents may include citric acid, succinic acid, sulfonyl benzene hydrazine, sulfonyl toluene semicarbazide, 5-phenyl tetrazole, sodium bicarbonate, and calcium carbonate.

It is also envisioned that in addition to the above described components, the multi-component polymer product may also contain optional materials, such as conventional additives used in polymeric materials including plasticizers, stabilizers including viscosity stabilizers and hydrolytic stabilizers, anti oxidants, ultraviolet ray absorbers, anti-static agents, dyes, pigments or other coloring agents, inorganic fillers, fire-retardants, lubricants, reinforcing agents such as glass fiber and flakes, foaming agents, processing aids, antiblock agents, release agents, and/or mixtures thereof.

Melt Filtration

Multi-component polymer products in accordance with the present disclosure may be recycled forming a molten polymer and filtering one or more additional components from the multi-component polymer product therefrom. It is also envisioned that where the multi-component polymer product contains multiple polymers with at least a polar polymer and at least a non-polar polymer, that the polymer components may be melted in conditions where the polar polymer coalesces, forming large particles. During the melting process, the dispersed polar phase tends to coalesce due to the thermodynamic energies. As the viscosity ratio between the polar and non-polar phases increases, there is a greater tendency for coalescence to occur which leads to an increase in the dispersed polar polymers particle size, being sufficient to be retained in a screen during filtration. The polar polymer particles may be selectively crosslinked to form crosslinked polar polymer particles, "freezing" the morphology of such particles. The selectively crosslinked polar polymers may be filtered from the molten continuous phase comprising the non-polar polymer. Filtration may occur by any screen or filer, such as a continued exchange screen, or any melt filtration system known in the art.

The first polymer of the multi-component polymer product may be melted in an extrusion process, such as with a single, double, or multi-screw extruder. Use of a melt filtration may allow for purification of the first polymer to specified standards to form a recycled polymer composition that may have a subsequent use while minimizing the presence of impurities such as incompatible inorganic materials and/or polar polymers. Further, it is understood that the melt filtration may occur within a single step or within multiple steps, for example. It is specifically envisioned that the melt filtration may occur (i) in single extrusion where the melting (and optionally the crosslinking) and the filtering occurs in a single extrusion step; or (ii) in double extrusion, where in the first extrusion, the melting (and optionally crosslinking) occurs while the filtering takes place in a second extrusion step. Based on the present disclosure, it may be evident for a person skilled in the art that between the two extrusion steps, the material formed after the first extrusion step may be pelletized to be fed in the second extrusion step.

In one or more embodiments, the extruder may be used at temperatures ranging from 70° C. to 320° C. in some embodiments, and from 150° C. to 320° C. in other embodiments and at shear rates lower than 1000 s$^{-1}$ and pressures of 5 to 200 bar. In embodiments where the multi-component polymer product includes a polar polymer as well as a non-polar polymer, the multi-component polymer product may be melted and the polar polymer in conditions which the polar polymer coalesces, forming poly polymer particles with a desirable particle size and one or more crosslinking agents may be used to enable the formation of a particulate morphology with low deformation by the crosslinking of those polar polymer particles. Further, embodiments of the present disclosure may also select extrusion conditions so as to result in relatively poor mixing (and dispersion of the polar polymer) and thereby encourage the formation of particle sizes of crosslinked polar polymer that may be screened or filtered from the molten polymer (e.g., larger than 30 microns, for example). The reduction of interactions between the crosslinked polar polymer particles or inorganic particles and the non-polar first polymer can be further aided by the addition of an inert component and/or other blowing agents as noted above. In embodiments where the additional component is a polar polymer, it is understood that the polar polymer may be modified by introduction of a crosslinking agent that is mixed with a multi-component product in the extruder, where filtration of the crosslinked polar polymer occurs in the same extruder (i.e., a single step process). Alternatively, the polar polymer may be modified in an extruder that is separate from the extruder in which the filtration occurs (i.e. a two-step process).

In one or more embodiments, the filtration occurs at a temperature that is 1) higher than the melting temperature (Tm) of the non-polar polymer with the highest Tm in the multi-layer polymer product and 2) lower than the Tm of the polar polymer with the lowest Tm in the multi-layer polymer product.

In another embodiments, when an amorphous polar polymer is present, the filtration occurs at a temperature that is 1) higher than the melting temperature (Tm) of the non-polar polymer with the highest Tm in the multi-layer polymer product and 2) higher than 50° C. than the glass transition temperature (Tg) of the polar polymer with the lowest Tg.

Prior to being melted, such as by an extruder, multi-component polymer products may optionally be subjected to a size reduction processing step. This size reduction step may occur by shredding, milling, grinding, chipping, granulating, agglutination or any combinations thereof. Such size reduction may depend, for example, on the type and/or size of the multi-component polymer product provided to the recycling system. In particular embodiments, it is envisioned in the case of a laminate with an inorganic material, the size reduction step may reduce the inorganic material layer to a particular size depending on the mesh screen size that will filter the inorganic material from the molten polymer.

Further, also prior to being melted, it is envisioned that the multi-layer product being melted is analyzed by DSC or DMA to detect the melting temperature of the glass transition temperature of the non-polar and polar polymers prior to subjecting. Such analysis may be used to determine the appropriate melt conditions for a given multilayer product.

In one or more embodiments, the extrusion may result in a recycled polymer composition that may subsequently be used to form an article. For example, recycled polymer compositions may be used in the manufacturing of articles, including rigid and flexible packaging for food products, household chemicals, chemicals, agrochemicals, fuel tanks, water and gas pipes, shrink films, stretch films, geomembranes, recycled articles and the like. In one or more embodiments, the article may be formed from a process selected from extrusion molding, injection molding, thermoforming, cast film extrusion, blown film extrusion, foaming, extrusion blow-molding, ISBM (Injection Stretched Blow-Molding), rotomolding, pultrusion, additive manufacturing, lamination, and the like, to produce manufactured articles. Specifically, in one or more embodiments, the article is an injection molded article, a thermoformed article, a film, a foam, a blow molded article, a 3D printed article, a compressed article, a coextruded article, a laminated article, an injection blow molded article, a rotomolded article, an extruded article, or a pultruded article.

It is also envisioned that the additional component, filtered from the molten polymer, such as the inorganic materials or the crosslinked polar-polymer particles, may also be used in the manufacturing of articles that are applicable.

EXAMPLES

Composition and Melting Point Identification

A multi-layer film defined as MULTI was processed according to the present disclosure. In order to evaluate the composition, the product and the melting points, DSC analysis according to ASTM D3418 was performed using a DSC TA-100 under argon atmosphere (flow rate of 50 mL/min). Samples were heated up to 270° C. and maintained by 5 min. After this, the samples were cooled to −20° C. at 20° C./min and re-heated at 10° C./min up to 280° C.

Figure 1:
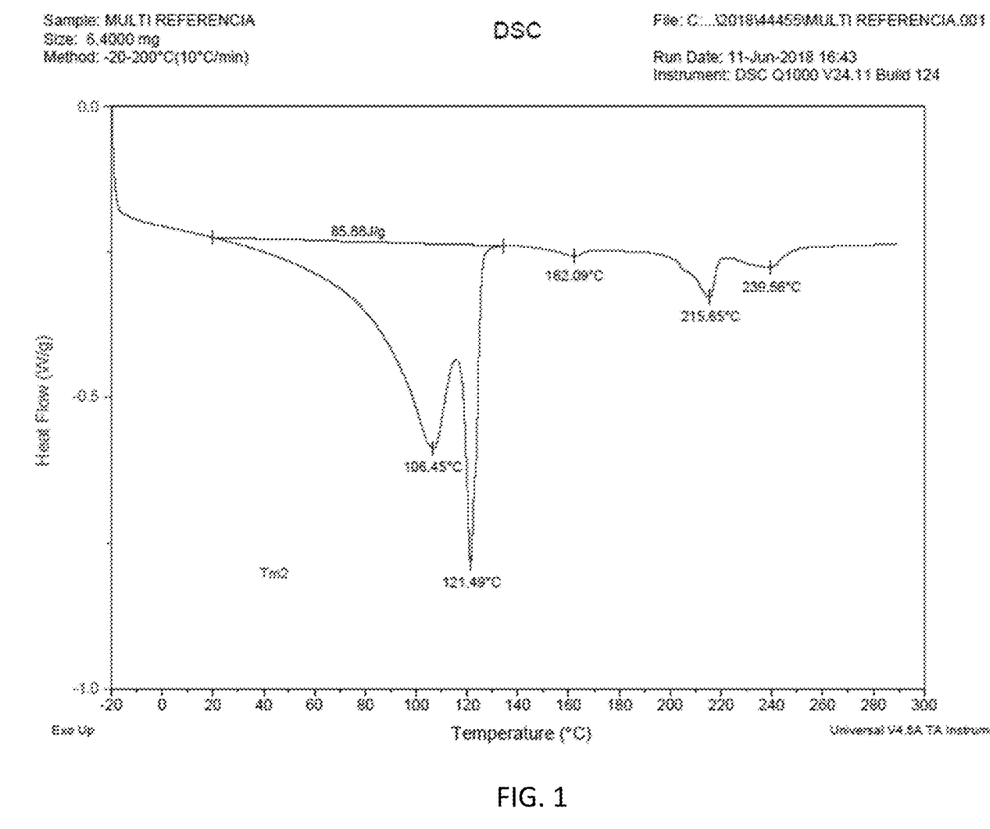
FIG. 1 is a DSC heat curve

FIG. 1 shows the DSC second heat curves for the sample, and the results of the suggested polymer present in the product based in the melting temperature (Tm2) is detailed in Error! Reference source not found. below.

TABLE 1

DSC analysis result for the two multi-layer polymer products

| Sample | Melting points Tm2 (° C.) obtained by DSC | Suggested polymer based in the Tm2 |
|---|---|---|
| MULTI | 106 | Low density polyethylene (LDPE) |
|  | 121 | Linear low polyethylene (LLDPE) |
|  | 162 | Polypropylene (PP) |
|  | 215 | Polyamide (PA6) |
|  | 240 | Polyethylene terephthalate (PET) |

The inventive processes were carried out in two different processing approaches: (i) in single extrusion where the melting (and optionally the crosslinking) and the filtering occurs in a single extrusion step; and (ii) in double extrusion, where in the first extrusion, the melting (and optionally crosslinking) occurs while the filtering takes place in a second extrusion step. It is evident for a person skilled in the art that between the two extrusion steps, the material formed after the first extrusion step may be pelletized to be fed in the second extrusion step.

In the examples where a crosslinking reaction takes place, the crosslinking agents (CA) were used as a masterbatch prepared in a ZSK-18 twin screw extruder. The masterbatch was prepared with a concentration of 20 wt % of crosslinking agent (CA) using a linear low density polyethylene (LLDPE) with a melt index of 1 g/10 min measured according to ASTM D1238 (190° C./2.16 kg) as carrier in powder form in order to absorb the liquid CA. The masterbatch was extruded at a temperature profile of 100/160/180/180/170/170/170/170/180/190° C. The use of masterbatch of CA is useful to make the feeding process simple and applicable to any already installed extrusion processes, without plant modifications. The selected CAs may be polyfunctional molecules, such as with more than 3 functional groups.

The filtering process was performed in a Haake Extruder, Rheomix, from Thermo Scientific. The single screw extrusion process was conducted at 50 rpm with a filter in a fixed plate with a screen set of 200/500/320/120/60 mesh to support the pressures in the screen without screen rupture. DSC curves from second heating were used to evaluate the composition samples after extrusion. The analysis was based in enthalpy and melt temperature changes of the multi-layer product. Additionally, SEM evaluation was done to confirm the effectiveness filtration. From DSC and SEM, it is possible to verify the filtering efficiency for each multi-layer sample. This efficiency is usually related to the increase in PE enthalpy, reduction in the disperse polar phase enthalpy and also related to a lower amount of dispersed particles in a comparison between SEM images. Samples may be examined using SEM after hot pressing the samples in accordance with ASTM D-4703 and polishing by cryo-ultramicrotomy the internal part of the plate. Samples may be dried and submitted to metallization with gold. The images were obtained by Tabletop SEM (Model TM-1000, from Hitachi).

Example 1—Thermal Filtration (without Crosslinking)

A thermal approach was performed to define the temperature to work with the MULTI sample in subsequent examples. In this example, the melting process runs without the use of a crosslinking agent to improve the viscosity of the dispersed polar particles.

TABLE 2

Process conditions of the inventive Example 1 as described in the present disclosure

| | | 1$^{st}$ extrusion Approach: Melting | | | 2$^{nd}$ extrusion Approach: Filtering | | |
|---|---|---|---|---|---|---|---|
| Example | Processing | Equipment | T (° C.) | Amount of CA | Equipment | T (° C.) | Screen set |
| 1a | Double Extrusion | Haake Rheomix | 240 | NA | Haake Rheomix | 170 | 200/500/320/120/60 |
| 1b | Double Extrusion | Haake Rheomix | 280 | NA | Haake Rheomix | 170 | 200/500/320/120/60 |

For both examples 1a and 1b, the melting and filtering occurred in different extrusion steps, but the temperature in the first extrusion step was higher in Example 1b. The filtration is conducted in the second step, where samples would be filtered at temperatures below the lowest melting temperature of the polar polymers (<215° C.) and higher than the highest melting temperature of the non-polar polymers (>162° C.).

In a DSC analysis, a skilled person in the art, upon reading this disclosure, may conclude that a decrease of the enthalpy value of the polar polymer followed by an increase in the enthalpy value of the PE is an indicative that some sort of the polar polymer is being retained in the filter, when coupled with a microscopy analysis.

The comparison, with the samples from the first extrusion (1a DEI and 1b DEI) and the second extrusion (1a DEII and 1b DEII) follow the criteria of increase in the PE enthalpy and decrease of polar polymer enthalpy.

Figure 2A:
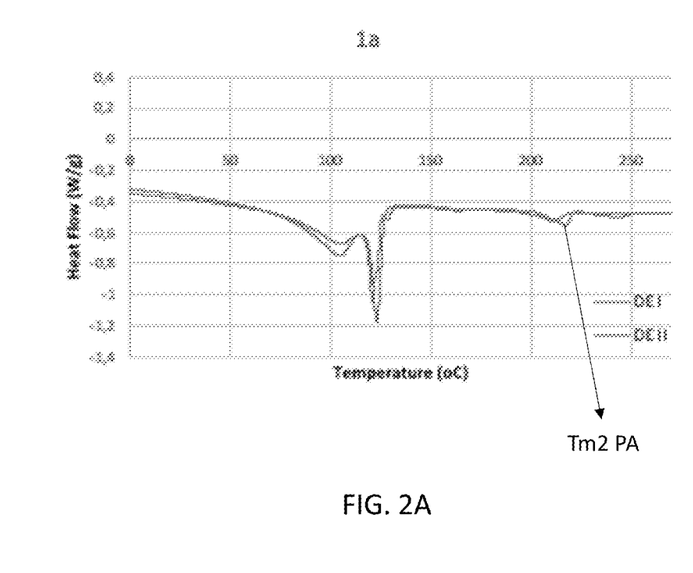
FIGS. 2A-2B are DSC heat curves.
Figure 2B:
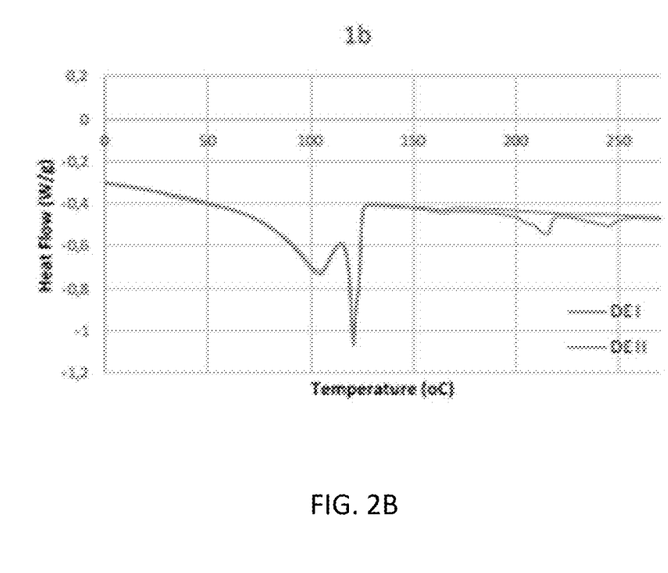

The enthalpy and melting temperatures for each of the materials detected in the DSC curves for Example 1a (FIG. 2A) and Example 1b (FIG. 2B) are detailed in the tables below. The increase or decrease (expressed as $\Delta\Delta H$ in %) of enthalpy values compared to the filtered reference of each material were also calculated according to the equation below:

$$\Delta\Delta H_{polymer} (\%) = ((\Delta H_{polymer\ after\ filtration} - \Delta H_{polymer\ prior\ to\ filtration}) / \Delta\Delta H_{polymer\ prior\ to\ filtration}) * 100$$

In these examples, there is a small change in melting temperature of PA in Example 1a (as can be seen in the DSC shown in FIG. 2A), and in the filtration step, that could be the explanation to a higher value in PA enthalpy in this sample.

TABLE 3

Enthalpy values of the inventive Example 1

| Enthalpy (J/g) | $\Delta H_{PE}$ | $\Delta H_{PA}$ | $\Delta H_{PET}$ | $\Delta\Delta H_{PE}$ | $\Delta\Delta H_{PA}$ | $\Delta\Delta H_{PET}$ |
|---|---|---|---|---|---|---|
| 1a DE I | 91.86 | 5.432 | 2.739 | — | — | — |
| 1a DE II | 99.46 | 6.65 | — | 8% | 22% | −100% |
| 1b DE I | 89.68 | 5.873 | 3.457 | | | |
| 1b DE II | 89.79 | — | — | 0% | −100% | −100% |

Figure 3A:
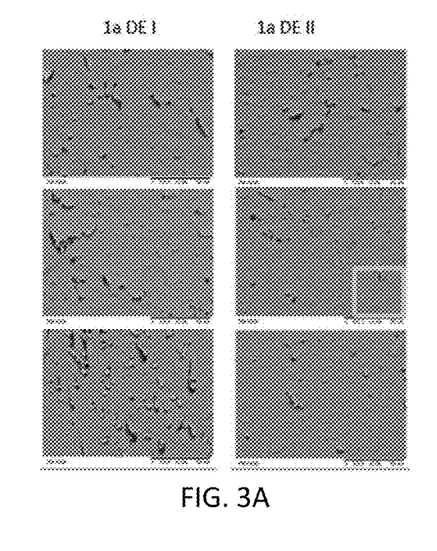
FIGS. 3A and 3B show SEM images.
Figure 3B:
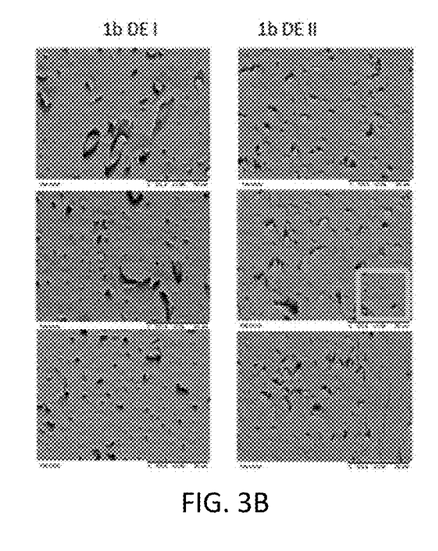

SEM images were used to check the morphology of the samples prior to filtration and after filtration for each sample (FIGS. 3A and 3B). The squares designed in the SEM images represents a mesh #500. The 2 different microscopies show reduction in the particles number and particle size in DEII step for both temperatures. It is also possible to observe that for example 1b, there are larger particles and a complete reduction in the enthalpy of both polar polymers, and no increase in the enthalpy of the PE phase was observed, which indicates that at 280° C. in the melting step, amorphous phase was obtained and the thermal filtration was not efficient. Combination of enthalpy and SEM images shows that for thermal filtration, there is a limit of temperature to operate the system as higher temperatures, although bringing a stronger process of coalescence of the polar polymers (as seen by the larger particle size of example 1b DEI in FIG. 3B), the higher temperature may culminate in a degradation process of the dispersed phase, so a lower temperature in the melting step seems to be more effective for the inventive filtration process.

Example 2—Evaluation of Different Crosslinking Agents (CA)

Figure 4:
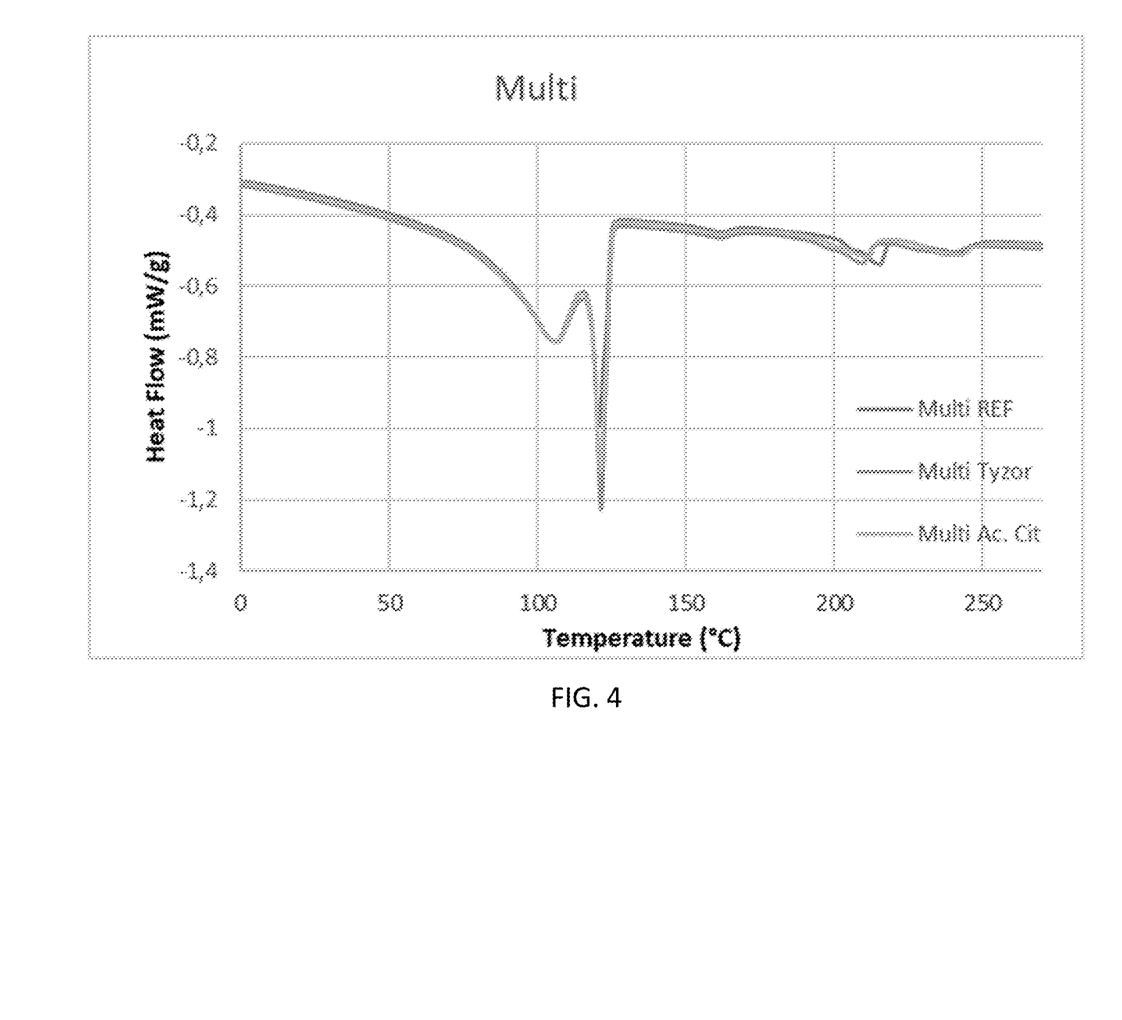
FIG. 4 is a DSC heat curve.

To evaluate the increase in the viscosity of the polar polymers by crosslinking, assisting the coalescence process in the melting step, two different crosslinking agents—citric acid and Tetra-n-butyl titanate (TnBT—commercially available as Tyzor® TnBT)—were chosen to check their activity over the PA6 and PET phase in the MULTI multi-layer polymer product in order to verify their interactions with both polar polymers. A reference filtration, without the crosslinking, was also conducted in order to verify the sole effect of the filtration process and compare the effects of the crosslinking in the process. A DSC analysis were conducted to the unfiltered material (reference), the filtered reference and the filtered crosslinked materials (Multi Citric Ac. and Multi Tyzor). FIG. 4 exhibits DSC curves for each material. Table 4 shows the process conditions and concentrations of CA used.

TABLE 4

Process conditions of the inventive examples as described in the present disclosure

| | | | 1$^{st}$ extrusion Approach: Melting and crosslinking | | | 2$^{nd}$ extrusion Approach: Filtering | | | |
|---|---|---|---|---|---|---|---|---|---|
| | | | | Sample 1$^{st}$ extrusion: | | | | Approach: Filtering | |
| Example | Processing | Equipment | T (° C.) | Multi-layer product + masterbatch | Amount of CA | Equipment | T (° C.) | Sample 2$^{nd}$ extrusion: | Screen set |
| 02 | Double Extrusion | Extruder ZSK-18 | 240 | Multi + Masterbatch$^{TB}$ | Final concentration of 3 wt % of CA | Haake Rheomix | 170 | Multi + Masterbatch$^{TB}$ (after 1st extrusion) | 200/500/ 320/120/60 |
| | | Extruder ZSK-18 | 240 | Multi + Masterbatch$^{CA}$ | Final concentration of 3 wt % of CA | Haake Rheomix | 170 | Multi + Masterbatch$^{CA}$ (after 1st extrusion) | 200/500/ 320/120/60 |

Masterbatch$^{TB}$: LLDPE + Tetra-n-butyl titanate (TnBT)
Masterbatch$^{CA}$: LLDPE + Citric Acid (CA)

The enthalpy of each polymer phase was calculated as below:

$$\Delta\Delta H_{polymer} (\%) = ((\Delta H_{polymer\ after\ filtration} - \Delta H_{polymer\ filtered\ reference}) / \Delta\Delta H_{polymer\ filtered\ reference}) * 100$$

TABLE 5

Enthalpy measurements for the samples of Example 2

| | Enthalpy(J/g) | | |
|---|---|---|---|
| Samples | $\Delta H_{PE}$ | $\Delta H_{PA6}$ | $\Delta H_{PET}$ |
| Filtered Reference (without crosslink) | 82.97 | 4.977 | 3.639 |
| Multi Citric Ac. (after filtration) | 89.09 | 4.323 | 3.649 |

TABLE 5-continued

Enthalpy measurements for the samples of Example 2

| Samples | Enthalpy(J/g) | | |
|---|---|---|---|
| | $\Delta H_{PE}$ | $\Delta H_{PA6}$ | $\Delta H_{PET}$ |
| Multi Tyzor (after filtration) | 90.73 | 4.486 | 2.812 |
| | $\Delta\Delta H_{PE}$ | $\Delta\Delta H_{PA}$ | $\Delta\Delta H_{PET}$ |
| Multi Citric Ac. | 7% | −13% | 0% |
| Multi Tyzor | 9% | −10% | −23% |

TABLE 6

Melting points (° C.) for the polymers in each sample of Example 2

| Samples | PE | PA6 | PET |
|---|---|---|---|
| Filtered Reference (without crosslink) | 106/121 | 216 | 245 |
| Multi Citric Ac. (after filtration) | 108/121 | 213 | 247 |
| Multi Tyzor (after filtration) | 107/122 | 217 | 242 |

Comparing the uncrosslinked and crossklinked material, no significant changes can be observed in Tm.

In a DSC analysis, a skilled person in the art may conclude that a decrease of the enthalpy value of the polar polymer followed by an increase in the enthalpy value of the PE is an indicative that some sort of the polar polymer is being retained in the filter, when no significant changes in the melting point is detected (thus indicating that there is no destruction of the crystallinity of the polymer).

For citric acid, there is a slight reduction in the melting point of the PA6 but no changes on the PET can be detected.

As the enthalpy of PA6 decreases and the enthalpy of PE increases, there is an indication that some PA6 was retained during the filtration process (but a concurrent process of crystallinity destruction may also be present due to the reduction of melting point). No changes in PET enthalpy nor melting temperature could be detected, thus indicating that citric acid does not react with PET.

For TnBT, there can be detected an increase in the PE enthalpy and a decrease of both PET and PA6 enthalpies, with no significant changes in the melting point, thus indicating that PA6 and PET were retained in the filtration process. In this particular case, it can be observed that the same crosslinking agent (TnBT) could be used to crosslink different polar polymers, indicating that some CAs may be used alone in the filtration process of multi-layer products comprising more than one polar polymer.

As TnBT is the crosslinking agent that most favorably act in the filtration process, it is also used in the following Examples 3 and 4 as the crosslinking agent fed as a masterbatch composition in order to simplify its application in extrusion process.

Example 3—Evaluation of Crosslinking Agent Concentration

Figure 5A:
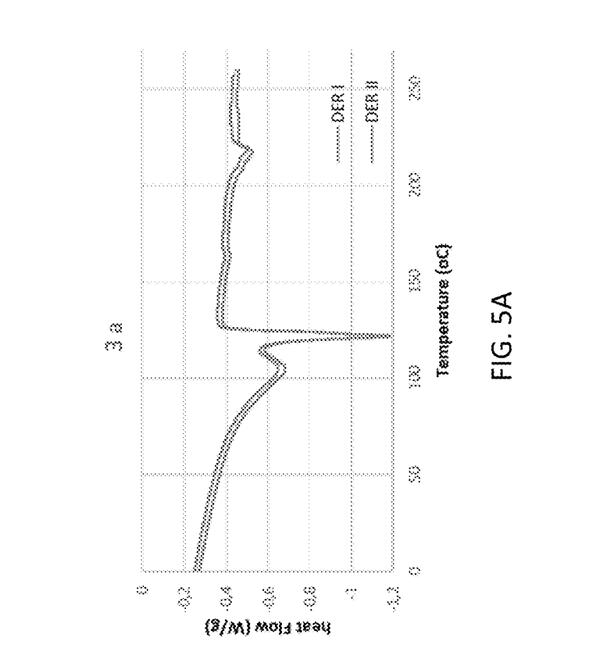
FIGS. 5A and 5B show DSC heat curves.
Figure 5B:
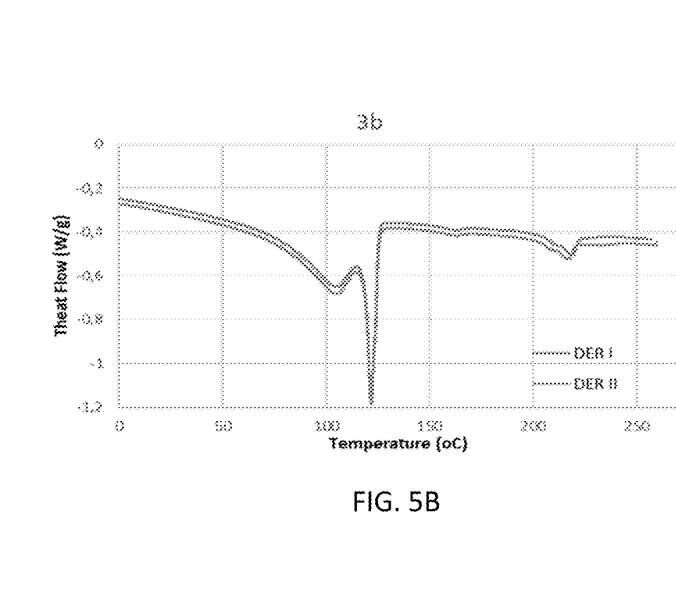

Example 3 is conducted in double extrusion with a crosslinking step, with a varied concentration of crosslinking agent (3 wt % and 5 wt %) in the MULTI sample. The crosslinking agent acts in the polar polymer particles, increasing the coalescence between the polymer particles and increasing their viscosity in similar process conditions as Example 1a. DSC analysis were conducted for the samples after crosslinking but prior to filtering (3aDERI and 3bDERI) and after filtering (3a DERII and 3b DERII). The comparison between the DSC curves prior to filtering and after is illustrated in FIGS. 5A and 5B.

TABLE 7

Process conditions of the inventive Example 3

| | | 1$^{st}$ extrusion Approach: Melting and crosslinking | | | 2$^{nd}$ extrusion Approach: filtering | | |
|---|---|---|---|---|---|---|---|
| Example | Processing | Equipment | T(° C.) | Amount of CA | Equipment | T (° C.) | Screen set |
| 3a | Double Extrusion | Haake Rheomix | 240 | 3 wt % of CA | Haake Rheomix | 170 | 200/500/320/120/60 |
| 3b | | Haake Rheomix | 240 | 5 wt % of CA | Haake Rheomix | 170 | 200/500/320/120/60 |

Masterbatch$^{TB}$: LLDPE + Tetra-n-butyl titanate (TnBT)

TABLE 10

Enthalpy for the polymers in each sample of Example 3

| Enthalpy (J/g) | $\Delta H_{PE}$ | $\Delta H_{PA}$ | $\Delta H_{PET}$ | $\Delta\Delta H_{PE}$ | $\Delta\Delta H_{PA}$ | $\Delta\Delta H_{PET}$ |
|---|---|---|---|---|---|---|
| 3a DERI | 90.9 | 7.829 | — | — | — | — |
| 3a DERII | 99.58 | 8.398 | — | 10% | 7% | — |
| 3b DERI | 92.20 | 7.378 | — | — | — | — |
| 3b DERII | 94.71 | 7.752 | — | 3% | 5% | — |

As a crosslinking step takes place, the complete enthalpy reduction for PET is a result of the chemical reaction, probably transforming the PET to amorphous phase (i.e., not detectable by DSC). It is expected that this reaction generates a higher molecular mass phase, easier to coalesce and be removed by filtration.

Figure 6A:
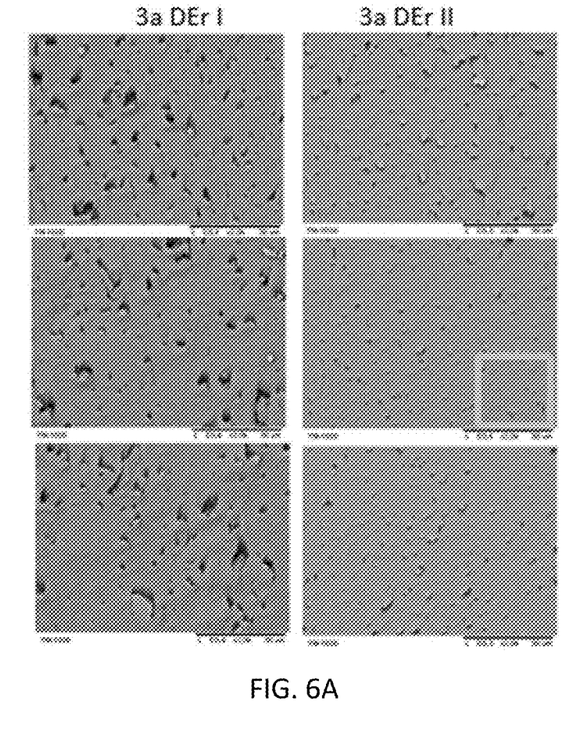
FIGS. 6A and 6B show SEM images.
Figure 6B:
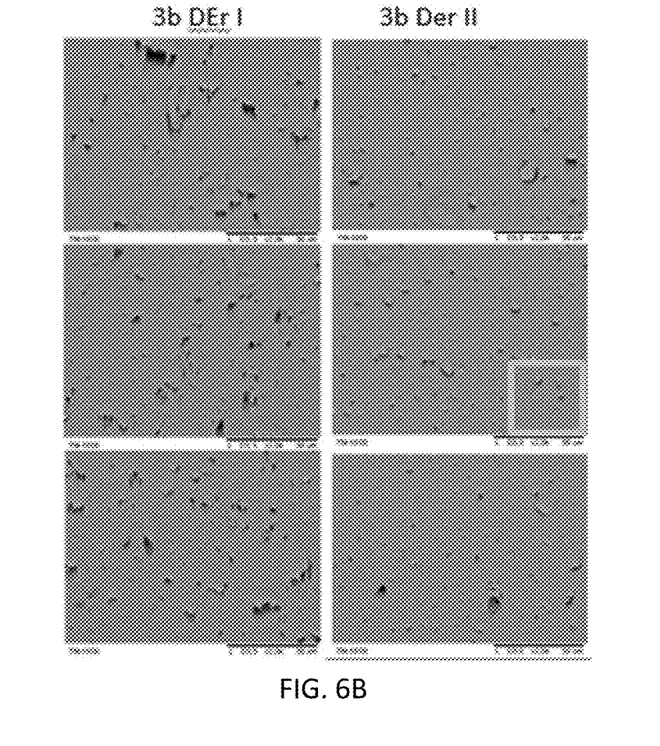

FIGS. 6A and 6B shows the SEM images for both samples prior filtration and after filtration. The higher content of crosslinking agent seems to accelerate the reaction over the polar polymer phase, leading to a probable concurrence between coalescence and crosslinking, where the higher concentration of CA causes a quicker reaction leading to a difficulty in the coalescence process prior to crosslinking, resulting in smaller particles (as can be seen by the comparison between example 3a DERI and example 3b DERI in SEM images). However, a reduction of particle number and size of the resulting polar polymer disperse phase is observed. The amount of 3 wt % of CA seems to be more adequate to modification, due to the increase the PE enthalpy and the reduction of polymer particles in the SEM images.

Example 4

In example 4, crosslinking with 3 wt % of CA at 2 different temperatures in singles extrusion was tested

TABLE 11

Process conditions for Example 4

| | | | 1$^{st}$ extrusion Approach: Melting, crosslinking and filtering | | |
|---|---|---|---|---|---|
| Example | Processing | Equipment | T (° C.) | Amount of CA | Screen set |
| 4a | Single Extrusion | Haake Rheomix | 240 | 3 wt % of CA | 200/500/3 20/120/60 |
| 4b | | Haake Rheomix | 280 | 3 wt % of CA | 200/500/3 20/120/60 |

TABLE 12

Enthalpy values for Example 4

| Samples | ΔHPE | ΔHPA | ΔHPET | ΔΔH$_{PE}$ | ΔΔH$_{PA}$ | ΔΔH$_{PET}$ |
|---|---|---|---|---|---|---|
| Sample prior to extrusion | 92.926 | 4.444 | 3.249 | | | |
| 4a DEr I | 90.97 | 4.64 | 2.481 | −2% | 4% | −24% |
| 4b DEr II | 92.81 | 4.831 | 2.44 | 0% | 9% | −25% |

Enthalpy values for samples prior to filtering process and after filtering are detailed in Table 12.

The crosslinking and filtration seems to be more efficient over PET phase, as there is almost no modification in the PE enthalpy, it seems to be evident that an amorphous phase were formed instead of retaining the particles in the filtration. As there is a competition between the coalescence of the particles and the crosslinking process, the coalescence process could not be present efficiently, and the reaction occurred prior to the ideal particle size formation. When the process takes place in a single step, a different extrusion configuration, such as feeding the crosslinking agent in the middle of the extruder, could lead to a correct in reaction time therefore leading to an efficient filtration.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A method of recycling a non-polar polymer from a multi-component polymer product, comprising:
    subjecting the multi-component polymer product comprising a non-polar polymer and at least one polar polymer to conditions to melt the non-polar polymer and the at least one polar polymer and coalesce the at least one polar polymer; and
    filtering the at least one coalesced polar polymer from the molten non-polar polymer at a temperature that is higher than a melting temperature (Tm) of the non-polar polymer and lower than a Tm of the at least one polar polymer with the lowest Tm.

2. The method of claim 1, wherein the subjecting further comprises subjecting to conditions to selectively crosslink the polar polymer.

3. The method of claim 1, wherein the non-polar polymer and the polar polymer are blended in the multi-component polymer product.

4. The method of claim 1, wherein the multi-component polymer product is a multi-layer polymer product.

5. The method of claim 4, wherein at least one layer comprises an additional component and at least another layer comprises the non-polar polymer.

6. The method of claim 1, wherein the method further comprises a size reduction step of the multi-component polymer product prior to the subjecting.

7. The method of claim 6, wherein the size reduction occurs by shredding, milling, grinding, chipping, granulating, agglutination or combinations thereof.

8. A method of recycling a non-polar polymer from a multi-layer polymer product, comprising:
    subjecting the multi-layer polymer product, the multi-layer polymer product comprising a plurality of polymer layers, the plurality of polymer layers including layers of polar polymer and layers of non-polar polymer, to conditions to melt the non-polar polymer and the polar polymer, to coalesce the polar polymer, and form polar polymer particles dispersed in a continuous phase comprising the non-polar polymer; and
    at least partially filtering the dispersed polar polymer from the continuous phase at temperature that is higher than a melting temperature (Tm) of the non-polar polymer and lower than a Tm of the polar polymer with the lowest Tm.

9. The method of claim 8, wherein the method further comprises a size reduction step of the multi-component polymer product prior to the subjecting.

10. The method of claim 9, wherein the size reduction occurs by shredding, milling, grinding, chipping, granulating, agglutination or combinations thereof.

11. The method of claim 8, wherein the polar polymer particles comprise a semi-crystalline polymer.

12. The method of claim 11, wherein the conditions to melt in the subjecting comprises subjecting the multi-layer polymer product to a temprature higher than a highest temperature (Tm) detectable in a DSC curve of the multi-layer polymer product.

13. The method of claim 8, wherein the polar polymer particles comprise an amorphous polymer.

14. The method of claim 13, wherein the conditions to melt in the subjecting comprises subjecting the multi-layer polymer product to a temperature at least 50° C. higher than a highest glass transition temperature (Tg) detectable in a DMA curve of the multi-layer polymer product.

15. The method of claim 8, further comprising selectively crosslinking the polar polymer particles prior to filtering.

16. The method of claim 8, wherein the polar polymer particles have an average particle size that is at least 15 μm.

17. The method of claim 8, wherein the non-polar polymer is a polyolefin.

18. The method of claim 8, wherein the polar polymer comprises at least one functional group selected from the group consisting of hydroxyl, carboxylic acid, carboxylate, ester, ether, acetate, amide, amine, epoxy, imide, imine, sulfone, phosphone and their derivatives.

19. The method of claim 18, wherein the polar polymer is selected from the group consisting of polyvinyl alcohol, ethylene vinyl alcohol copolymer, polyamide, ethylene vinyl acetate copolymer, polyvinylidene fluoride, polyethylene terephthalate, and mixtures thereof.

20. The method of claim 8, wherein the polar polymer is selectively crosslinked by a crosslinking agent selected from the group consisting of maleic anhydride, maleic acid, itaconic acid, itaconic anhydride, succinic acid, succinic anhydride, succinic aldehyde, adipic acid, adipic anhydride, phthalic anhydride, pthalic acid, glutaconic acid, glutaconic anhydride, glutaraldehyde, citric acid, sodium tetraborate, organic titanates such as tetrabutyl titanate, organic zirconates such as zirconium(IV) bis(diethyl citrato)dipropoxide, methoxy polyethylene glycol acrylates, ethoxy polyethylene glycol acrylates, ethylene glycol diacrylate, ethylene glycol dimethacrylate, polypropylene glycol diacrylate, polypropylene glycol dimethacrylate, 1,3-butylene glycol diacrylate, 1,3-butylene glycol dimethacrylate, neopentyl glycol diacrylate, neopentyl glycol dimethacrylate, trimethylol ethane triacrylate, trimethylol ethane trimethacrylate, trimethylol propane triacrylate, trimethylol propane trimethacrylate, and tetramethylol methane tetracrylate, their derivatives and mixtures thereof.

21. The method of claim 8, wherein the method further comprises analyzing the multi-layer product by DSC or DMA to detect a melting temperature or a glass transition temperature of the polar polymers and non-polar polymers prior to subjecting.

22. The method of claim 8, wherein the subjecting and the filtering occurs in an extruder.

23. The method of claim 22, wherein the subjecting and the filtering occurs in two different extrusion steps.

24. The method of claims 23, wherein the filtering step occurs at a temperature higher than a melting temperature (Tm) of the non-polar polymer with the highest Tm in the multi-layer polymer product and lower than a Tm of the polar polymer with the lowest Tm in the multi-layer polymer product.

25. The method of claim 22, wherein the extruder is operated to provide a shear rate less than 1000 s−1, under temperatures of 150 to 320° C., and pressures of 5 to 200 bar.

26. The method of claim 22, further comprising injecting an inert component into the extruder, wherein the inert component is capable of swelling the molten first polymer or the continuous phase.

27. The method of claim 26, wherein the inert component is injected at an amount ranging from 0.5 to 20 wt % of the multi-component polymer product or the multi-layer polymer product.

28. The method of claim 26, wherein the inert component is selected from a group consisting of $CO_2$, $N_2$, water, organic solvents and combinations thereof and wherein the inert component is in a gaseous, liquefied or supercritical state.

29. The method of claim 26, further comprising degassing the molten first polymer or the continuous phase after filtration.

30. The method of claim 22, further comprising: injecting a blowing agent into the extruder, wherein the blowing agent produces an inert component capable of swelling the molten first polymer or the continuous phase by decomposition.

31. A method of recycling a non-polar polymer from a multi-layer polymer product, comprising:
subjecting the multi-layer polymer product, the multi-layer polymer product comprising a plurality of polymer layers, the plurality of polymer layers including at least one layer of the non-polar polymer, and at least one layer of a polar polymer, to conditions to melt the non-polar polymer and the polar polymer and coalesce the at least one polar polymer;
selectively crosslinking the polar polymer; and
filtering the selectively crosslinked polar polymer from the molten non-polar polymer at a temperature that is higher than a melting temperature (Tm) of the non-polar polymer and lower than a Tm of the polar polymer with the lowest Tm.

32. The method of claim 31, wherein the first polymer or the non-polar polymer is a polyolefin selected from a group consisting of ethylene homopolymers, copolymers of ethylene and one or more C3-C20 alpha-olefins, propylene homopolymers, copolymers of propylene and one or more comonomers selected from ethylene or C4-C20 alpha-olefins, heterophasic propylene polymers, olefin terpolymers, and blends thereof.

* * * * *